United States Patent [19]

Torielli

[11] Patent Number: 5,192,165

[45] Date of Patent: Mar. 9, 1993

[54] TRENCHLESS REPLACEMENT OF CONDUITS IN AN UNDERGROUND CONDUIT BANK

[75] Inventor: Robert J. Torielli, Piscataway, N.J.

[73] Assignee: PIM Corporation, Piscataway, N.J.

[21] Appl. No.: 864,358

[22] Filed: Apr. 6, 1992

[51] Int. Cl.$^5$ .............................................. F16L 55/18
[52] U.S. Cl. .................................. 405/156; 405/154; 405/184; 166/55.3; 138/97; 138/111
[58] Field of Search ....................... 405/154, 156, 184; 30/92.5; 166/55.3; 138/111, 97, 98

[56] References Cited

U.S. PATENT DOCUMENTS

| | | |
|---|---|---|
| 3,181,302 | 5/1965 | Lindsay . |
| 3,728,790 | 4/1973 | Blakeslee ............................ 30/92.5 |
| 4,100,980 | 7/1978 | Jenne .................................. 175/19 |
| 4,147,449 | 4/1979 | Kato ................................ 138/111 X |
| 4,507,019 | 3/1985 | Thompson ....................... 405/184 X |
| 4,634,313 | 1/1987 | Robbins .............................. 405/184 |
| 4,720,211 | 1/1988 | Streatfield .......................... 405/154 |
| 4,789,268 | 12/1988 | Yarnell ............................... 405/154 |
| 4,903,406 | 2/1990 | Schosek et al. ................. 405/156 X |
| 4,983,071 | 1/1991 | Fisk et al. ........................... 405/154 |
| 5,036,891 | 8/1991 | Vogelsang ...................... 138/111 X |
| 5,069,254 | 12/1991 | Vogelsang .......................... 138/111 |
| 5,078,546 | 1/1992 | Fisk et al. ............................ 405/156 |
| 5,098,225 | 3/1992 | Rockower et al. ................. 405/156 |

OTHER PUBLICATIONS

ArroRam 60—Date: Prior to Apr. 6, 1991—2 pages.
Elephant Replacement and Rehab, Inc.—Date: Prior to Apr. 6, 1991—4 pages.
Ditch Witch Rod Pushers—Date: Nov., 1987—4 pages.
Pierce Airrow Pneumatic Piercing Tools—Date: Oct., 1990—4 pages.
Accu—Punch "For boring Right on Target"—Date Feb., 1987—6 pages.
Vermeer "Hammerhead Mole Pneumatic Boring Tools"—Date: Prior to Apr. 6, 1991—6 pages.
The Bullet "Split—The Cost and Time of Conventional Excavation"—Date: Prior to Apr. 6, 1991—1 page.
TRS Brochure—Date: Prior to Apr. 6, 1991—8 pages.
PIM Corporation "Cost Effective Pipeline Replacement Systems From PIM Corporation"—Date: Prior to Apr. 6, 1991—2 pages.

Primary Examiner—Randolph A. Reese
Assistant Examiner—Arlen L. Olsen
Attorney, Agent, or Firm—Larson and Taylor

[57] ABSTRACT

A method and apparatus for replacing an individual conduit located within a bank of individual conduits, without rendering inoperable the surrounding adjacent individual conduits of the bank. A conduit expander is pulled through the subject individual conduit to break it and push the pieces out. Knife blades may be used to split the individual conduit. A rearward flared out portion pushes the broken conduit outwardly far enough for a new conduit to be moved therethrough, but not far enough to render inoperable the surrounding adjacent individual conduits of the bank. A replacement conduit is attached to the rear end of the conduit expander and moved into the individual conduit as the conduit expander moves therethrough.

4 Claims, 6 Drawing Sheets

TRENCHLESS REPLACEMENT OF CONDUITS IN AN UNDERGROUND CONDUIT BANK

FIELD OF THE INVENTION

This invention relates to replacement of underground conduits, and it relates in particular to the replacement of individual conduits within a conduit bank.

BACKGROUND OF THE INVENTION

Underground wires and the like, including for example electrical wires, communication and T.V. cables, etc., extend underground through conduits. These conduits, which may be made of many different materials such as steel, pre-cast concrete, PVC, fiber or clay tile are generally buried in layers of as few as two or as many as twenty or more which are stacked either directly on top of one another or arranged side-by-side or separated by thin layers of sand. Taken together, the plurality of conduits form a conduit bank which generally runs between underground cable vaults, a cable vault being the accessible underground space beneath a mancover or the like.

Individual conduits of a bank from time to time become inoperable. For example, an existing conduit may simply deteriorate or it may become obstructed due to damage or the settlement of various sections of the conduit bank. Or, an existing conduit may become obsolete as it would lack sufficient capacity to accommodate a modified new cable installation.

Until now, replacing a conduit necessitated excavation of the ground for the complete distance from one cable vault to the next, even if it were necessary to replace only one individual conduit of the conduit bank from end to end. Such excavation is both costly and time consuming. Further, if it is necessary to excavate for the entire length of the conduit bank, there is no means of replacing an individual conduit which is located within the interior of a conduit bank except by removing and replacing all of the surrounding conduits. This of course substantially increases the cost of replacement.

Replacement of an existing pipe, for example a water supply pipe, a sewage pipe or the like without excavation is known. In accordance with this technique, pits are dug down to the pipe at spaced apart locations. One enters the first pit, enters the pipe and inserts a device which moves through the pipe, effecting replacement thereof with a new pipe which is pulled therethrough until the device reaches the other pit, at which point it is pulled out or the process is continued. Such methods and apparatus are shown for example in the Streatfield et al U.S. Pat. No. 4,720,211, the Yarnell U.S. Pat. No. 4,789,268 and the Lindsay U.S. Pat. No. 3,181,302. However, notwithstanding the use of this trenchless technique (that is, in the sense that it does not require a continuous trench for the full length of the pipe being replaced) it remains the state of the art in the field of conduit banks for wires, cables and the like to excavate a trench for the entire length of the conduit bank.

Thus, there exists a need for an improved method and apparatus for replacing some or all of the individual conduits within a conduit bank of the type carrying electrical wires, cables and the like, which does not require full length excavation.

An alternative repair/replacement practice is to simply run a new conduit into an existing conduit. However, by necessity, the newer conduit would then have a smaller internal diameter than the existing conduit and thus will be of reduced wire or cable carrying capacity.

SUMMARY OF THE INVENTION

Thus, it is a purpose of the present invention to provide a new and improved technique for replacing individual conduits within a conduit bank of the type which carries electrical wires, communication and T.V. cables and the like.

This purpose is achieved in accordance with the method and apparatus of the present invention by moving a conduit expander through the individual conduit being replaced in such a manner that this individual conduit is expanded sufficiently to receive a new replacement conduit, preferably of approximately the same inside diameter as the original conduit, or larger, which is towed in as the conduit expander moves therethrough without adversely affecting, i.e., without rendering inoperable, the surrounding adjacent conduits of the conduit bank.

Conduit banks of this type generally run in sections between underground spaces, known as cable vaults, which are accessible from the surface through a manhole or the like. These cable vaults are usually 250 to 300 feet apart, meaning that each individual conduit being replaced would be of that length.

In carrying out the present invention, the conduit expander is inserted at one end of the bank, i.e., at a first cable vault, with the replacement conduit attached thereto and leading to a storage reel of the tubular replacement conduit, usually a HDPE (High Density Polyethylene) tube, located on the ground above the cable vault. The conduit expander, with the replacement conduit attached thereto, is moved through the existing individual conduit. Movement may either be by pulling, e.g., by a winch cable which extends through the conduit to the other cable vault whereat there is provided a frame and appropriate power mechanisms for pulling the cable and hence the conduit expander through the conduit, or by pushing, e.g., by a hydraulic rod pusher.

The conduit expander itself preferably comprises a tapered conical front portion, the front end of which is smaller than the inside diameter of the conduit being replaced so as to facilitate entry of the conduit expander into that conduit. The front conical portion is followed by an intermediate cylindrical portion having an outer diameter approximating the inside diameter of the individual conduit, but slightly less, so as to reduce friction. The purpose of this intermediate cylindrical portion is to stabilize the expander as it moves through the conduit. The length of this intermediate portion is dependent on the degree of stabilization that is required. At the rearward end of the cylindrical portion, the expander flares outwardly to an enlarged outside diameter approximately one inch greater than the inside diameter of the conduit.

Depending on the material of the conduit, one or two knife blades may be mounted on the cylindrical portion just ahead of the rearward flared out portion. If knife blades are provided, they initially slit the conduit, after which the flared out portion may or may not further break up the conduit (depending on the material of which it is formed) after which it definitely pushes the broken conduit outwardly. If knife blades are not employed, the flared out portion both breaks up the conduit and pushes the broken conduit outwardly. This rearward flared portion is followed by a cylindrical clamping portion having an outer diameter approximately the same as the largest diameter of the rearward flared out portion. This rearward cylindrical portion or clamping mechanism clamps the replacement conduit so that the latter can be towed through the conduit as the conduit expander moves therethrough.

A conduit bank may have any number of conduits including two or three up to twenty or more conduits stacked side-by-side and on top of one another. While arranged in a bank, the individual conduits are still usually not integrally connected to each other. Thus, in carrying out the present invention, expanding the individual conduit may cause the surrounding conduits to move upwardly, downwardly or sideways to some extent. However, the present invention has been able to strike a balance between expanding the individual conduit being replaced sufficiently for replacement of a new conduit having approximately the same or possibly a larger inside diameter than the original conduit, while not exerting a force on the adjacent surrounding conduits to a level which would damage them to render them inoperable.

In an alternative environment, wherein the conduit bank comprises a honeycomb arrangement, it may be desirable to break through a plurality of existing cells and replace them with a single larger replacement conduit, still not damaging the overall structure of the conduit bank.

On occasion, the conduit bank extends in a curved path rather than a straight path between adjacent cable vaults. In this instance, the conduit expander must be capable of negotiating this curvature. This can be accomplished in several ways. First, the length of the conduit expander itself can be shortened to assure stability to negotiate the curve. Alternatively, the conduit expander can be constructed in a plurality of sections which are articulated together by hook eyes, chain links or the like.

Thus, it is an object of the present invention to provide a method for replacing individual conduits within an underground conduit bank with a replacement conduit of approximately equal or larger inside diameter while not rendering inoperable the surrounding conduits of the bank.

It is another object of the present invention to provide, in combination, an underground conduit bank of the type which carries wires, cables and the like, an apparatus capable of expanding an individual conduit of the bank and towing in a replacement conduit without rendering inoperable the surrounding conduits of the bank.

Other objects and advantages of the present invention will become more apparent from the detailed description to follow, taken together with the accompanying drawings.

BRIEF DESCRIPTION OF THE DRAWINGS

There follows a detailed description of preferred embodiments of the present invention, to be taken together with the accompanying drawings, wherein.

DETAILED DESCRIPTION OF THE PREFERRED EMBODIMENTS

Referring now to the drawings, like elements are represented by like numerals throughout the several views.

Figure 1:
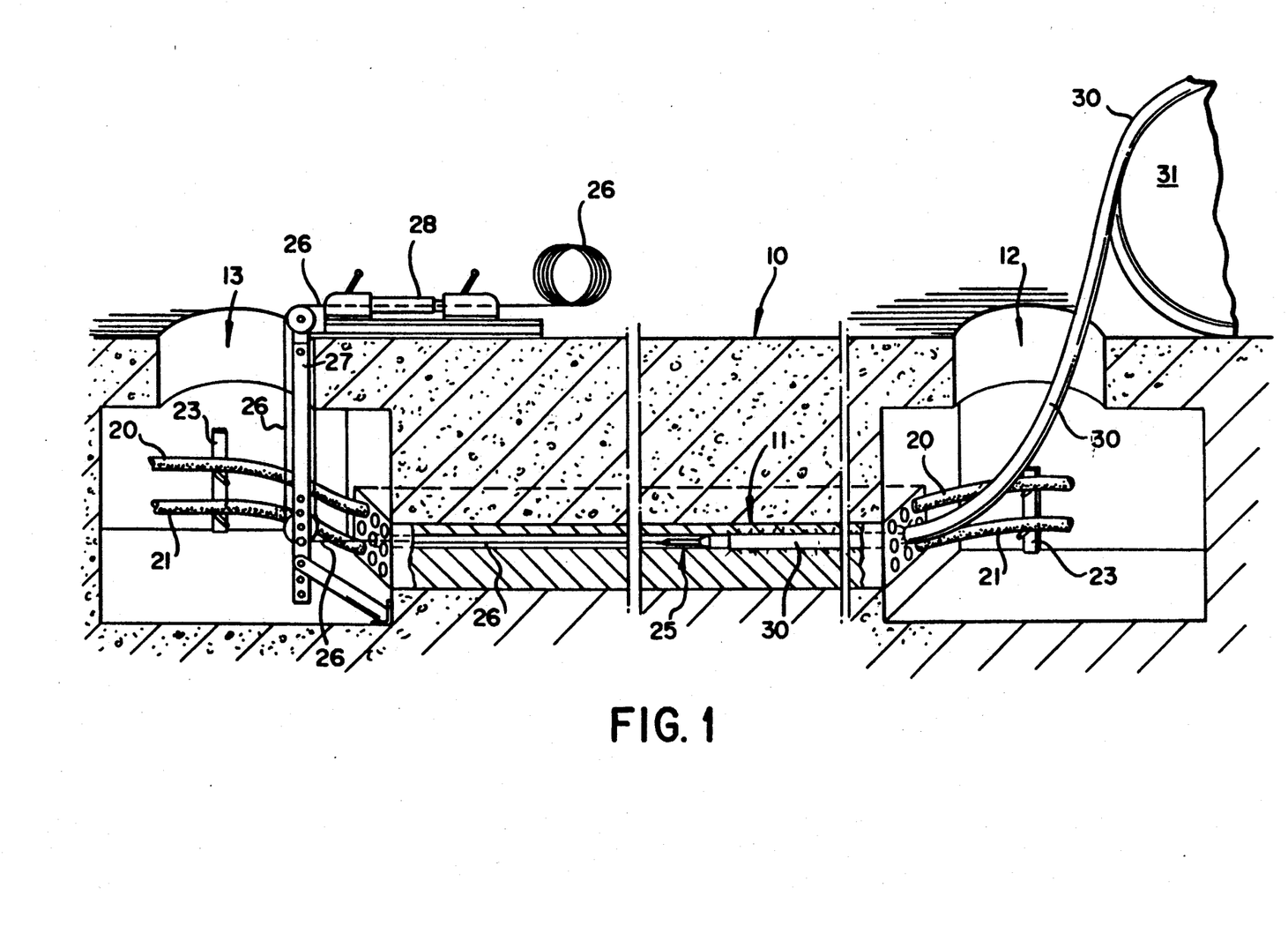
FIG. 1 is a schematic view of the street environment in which the present invention would be employed.

FIG. 1 illustrates the environment in which the present invention is utilized and schematically illustrates the basic features of the present invention. An area 10 at ground level has buried therebeneath a conduit bank 11 which extends between spaced apart open areas known as cable vaults 12 and 13, these generally being accessible from ground level through manhole coverings.

Figure 2:
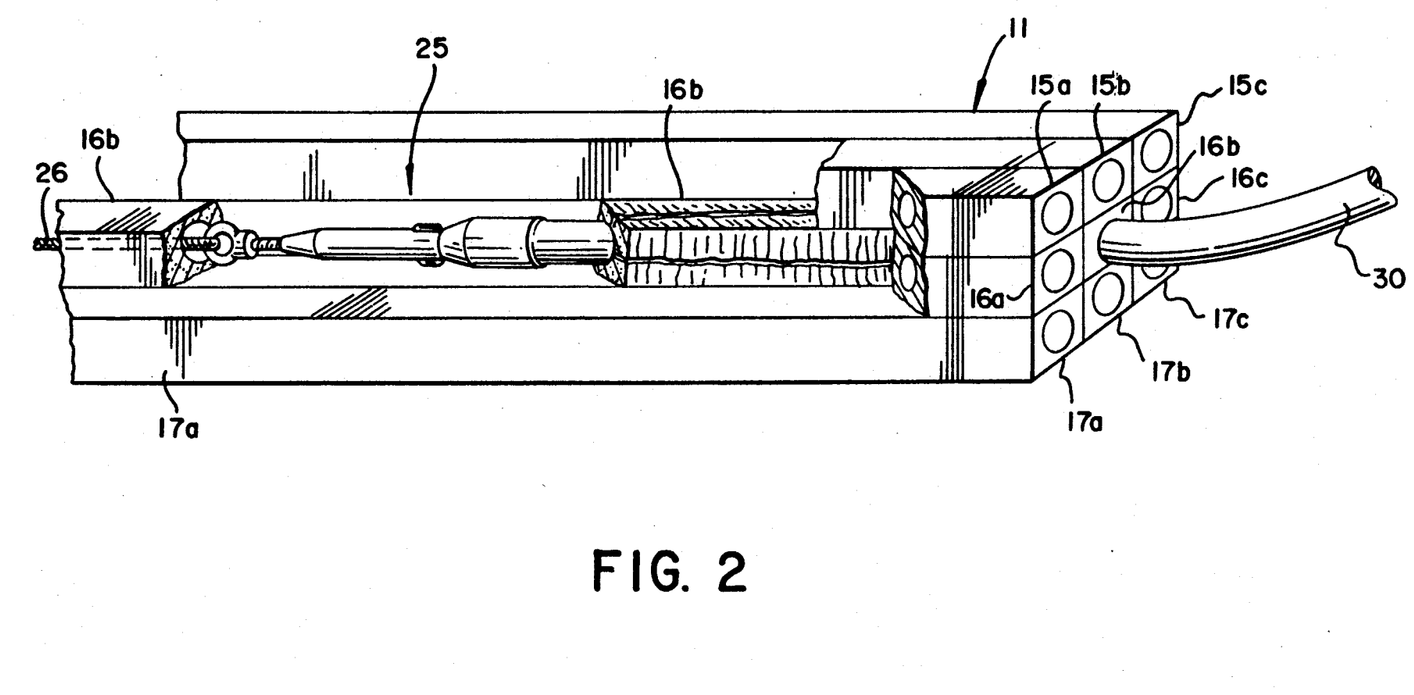
FIG. 2 is an enlarged cut-away view of a portion of FIG. 1.

The conduit bank 11 can have as few as two or as many as twenty or even more separate conduits located side-by-side and stacked vertically. Generally, they are adjacent each other although they can be separated by thin layers of sand or the like running the length of the conduit bank. The conduit bank 11, merely for purposes of illustration, comprises nine separate individual conduits, as shown in FIG. 2, the conduits of the top row being referred to as 15a, 15b and 15c, those of the middle row as 16a, 16b and 16c and those of the bottom layer as 17a, 17b and 17c. The following discussion will describe for purposes of illustration, replacement of the middle conduit 16b. However, it will be understood that the replacement technique is applicable to any individual conduit of the bank. Those conduits not being replaced will have existing cables running through them which need not be disturbed by the replacement of the present invention. For example, referring to FIG. 1, existing cables 20 and 21 utilizing individual conduits 15c and 17c are illustrated as coming out of the conduit bank 11 at both ends. At each end, as the existing cables pass through the cable vaults 12 and 13, they will be supported by suitable means such as brackets 23 as they extend to the opposite side of each respective cable vault and into conduit banks starting from those opposite walls and continuing in opposite directions (not shown). Thus, not only does the present invention avoid adverse effects on surrounding conduits of the bank, but in fact it makes it possible for those other conduits to remain operable to carry live, operative wires and cables without interrupting the functioning thereof.

FIGS. 1 and 2 illustrate the conduit expander 25 in the midst of replacing conduit 16b. Ahead of expander 25 is a winch cable 26 which enters the cable vault 13 where it is directed via a suitable frame, boom and pulley mechanism 27 to a power winch 28 located at ground level. As is apparent, this mechanism, which is known per se, will provide sufficient power to pull the expander 25 through the conduit as the pulleys of the frame 27 assure that the force is applied to the winch cable 26 within the conduit 16b in the proper direction.

At its rear end, the expander 25 firmly secures the forward end of the replacement conduit 30, the major portion of which is mounted on a storage reel 31 at ground level, reached via cable vault 12.

An important feature of the present invention is to replace the existing conduit with a new conduit having an inside diameter which is essentially no less than the inside diameter of the existing conduit. However, in a technical sense, the replacement conduit, which will preferably be HDPE (High Density Polyethylene), will actually have an inside diameter just slightly less than the inside diameter of the original conduit. However, it is sufficiently close to the inside diameter of the original conduit that it is considered in essence to be a replacement of approximately the same size. Of course the present invention is also capable of expanding the existing conduit substantially so as to replace it with a conduit of substantially larger inside diameter, wherein the term "substantial" is limited by the characteristics of the surrounding conduits, such that they not be adversely affected.

Figure 3:
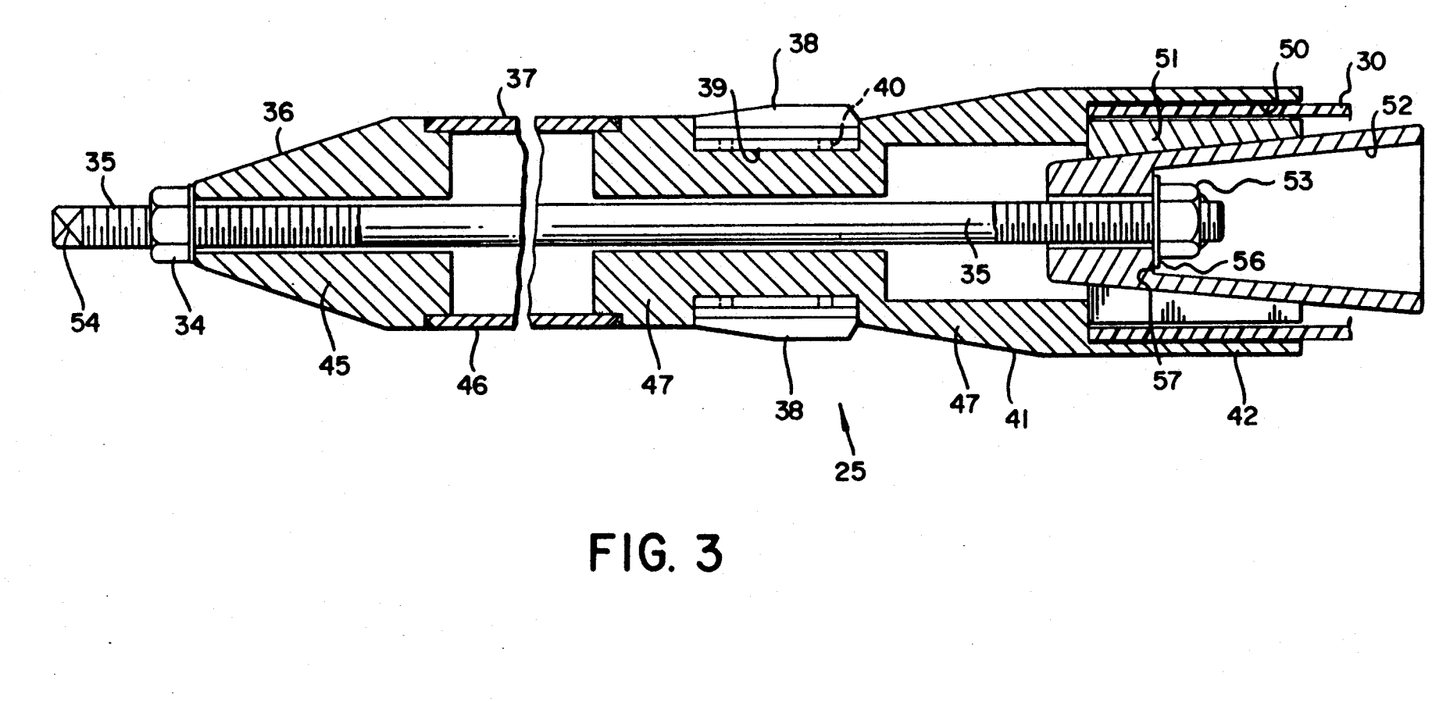
FIG. 3 is a central longitudinal sectional view of an apparatus of the present invention.
Figure 4:
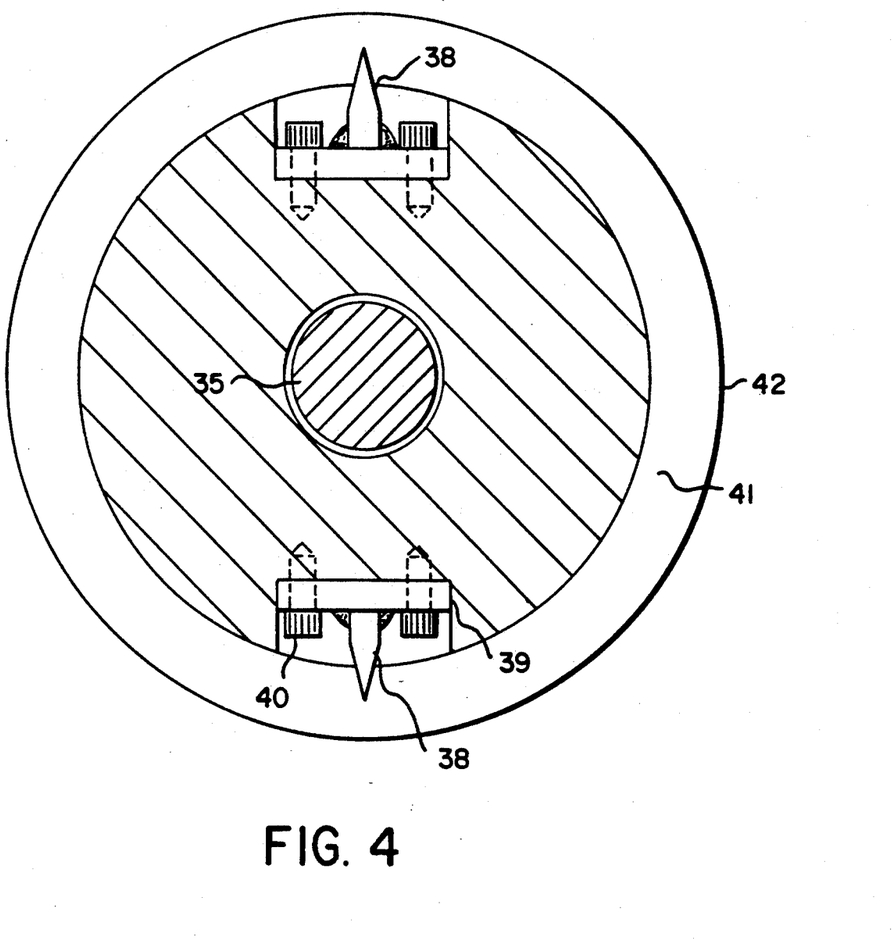
FIG. 4 is a cross-sectional view taken along line 4—4 of FIG. 3.
Figure 5:
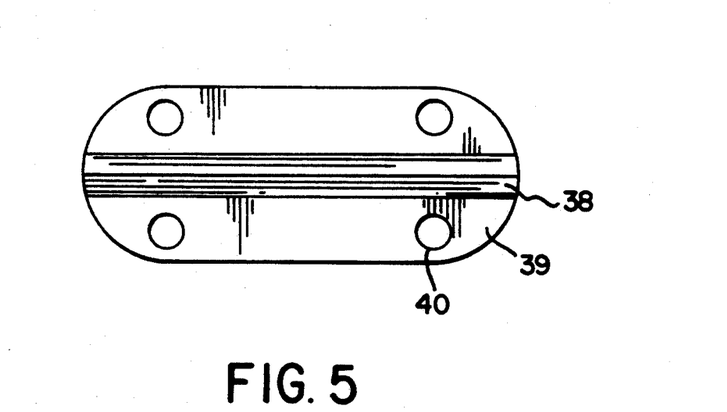
FIG. 5 is a top view of a portion of FIG. 3.

The conduit expander itself is shown in detail in FIGS. 3 through 5. The parts of the expander are mounted on a central rod 35 which is threaded at least at its forward and rear ends. At its rear end, a nut 53 is threaded thereon and welded, while a nut 34 is removably secured to the front end. As will be apparent, this permits the apparatus to be disassembled by removing the nut 34 from the rod and pulling the rod rearwardly through the apparatus.

In the assembled position as shown, the rod includes at its forward end a towing eye 54 for attachment to winch cable 26.

The operative outer surface of the expander 25 includes a front conical tapered head 36 tapering upwardly and rearwardly to a maximum diameter which is approximately equal to, but slightly less than the diameter of the existing conduit. The function of this front conical portion is to facilitate easy entry of the expander into the conduit. The expander further includes an intermediate cylindrical portion 37 having a constant outside diameter slightly less than the inside diameter of the conduit. The purpose of this intermediate portion is to stabilize the expander, relative to the conduit, to facilitate the expanding function which is accomplished by parts to the rear of cylindrical portion 37. Toward the rear end of cylindrical portion 37 there is shown knife blades 38. As illustrated, and also with reference to FIGS. 4 and 5, these blades 38 are welded onto plates 39 which are removably secured by screws 40 onto recesses formed in the cylindrical portion 37.

Immediately to the rear of the blades 38 is the rearward flared portion 41 which flares conically outwardly from an initial outside diameter less than the diameter of the conduit to a maximum outside diameter which is greater than the inside diameter of the conduit. The function of this rearward flared portion is to physically move the existing conduit outwardly to make room for the new replacement conduit being towed thereby.

The specific environment of the conduit being replaced will determine the characteristics with respect to the blades and the rearward flared portion. For example, materials such as concrete, tile and fiber can be broken and pushed outwardly by flared portion 41 alone, without the use of blades. Alternatively, if the existing conduit is of plastic or steel, blades would be required. For plastic, one would use a blade of soft steel but having a sharper edge while when replacing a steel conduit, the blade would be of a harder steel but have a somewhat more blunt edge. To facilitate this variation, the blades 38, with their plates 39, to which they are preferably welded, are easily removable from the cylindrical portion by means of removable screws 40.

Also, different environments can dictate whether one or two cutting blades would be desirable. For example, when replacing an individual conduit located on the exterior of the conduit bank (essentially, every other conduit of conduit bank 11 except 16b) a single blade can be provided at that point closest to the adjacent conduits (i.e., the points closest to conduit 16b in the illustrated embodiment) thereby causing a predominant expansion away from the existing conduit, thereby facilitating the goal of minimizing adverse effects on the other conduits of the bank. Also, if it is desired to expand an existing conduit a very substantial amount to replace it with a conduit of somewhat larger diameter than the existing conduit, this would suggest the use of two blades rather than one. Also, if the conduit being replaced is itself a plastic, i.e., PVC conduit, it might be preferable to split it at more than one location since, with a single split, the existing PVC tube might have a tendency to spring back, creating additional friction to resist movement of the expander 25 therethrough.

Of course it will be understood that it may be desirable and it is within the scope of the present invention to utilize different arrangements of blades, for example any number of them spaced symmetrically or asymmetrically about the circumference of the expander.

Rearward of flared out portion 41 is a cylindrical clamping mechanism 42. This portion 42 preferably has a ribbed inside surface 50 which receives the front end of replacement conduit 30. This replacement conduit 30 is gripped on its inner surface by a resilient, preferably nylon clamping ring 51 which is preferably ribbed on its exterior surface to facilitate a strong engagement of replacement conduit 30. This ring 51 is a split ring, the split opening being shown (by the absence of cross section) at the bottom of FIG. 3. This split can be quite small, for example only a slit through the material, its function simply being to permit this ring 51 to expand outwardly to grip the replacement conduit 30. This gripping action is achieved by forward movement, i.e., to the left, of a clamping cone 52 which is urged to the left by engagement of the nut 53 via washer 56 with the surface 57 of the clamping cone 52.

Although the expander can be constructed of one or several pieces, in the illustrated embodiment the expander comprises a solid front part 45 and a large central part 47, which parts are interconnected by a cylindrical member 46 to which both parts 45 and 47 are welded. This construction has the advantage that if it is desired to use a shorter cylindrical portion 37, then the parts can be constructed utilizing a cylindrical member 47 of shorter length.

Figure 9:
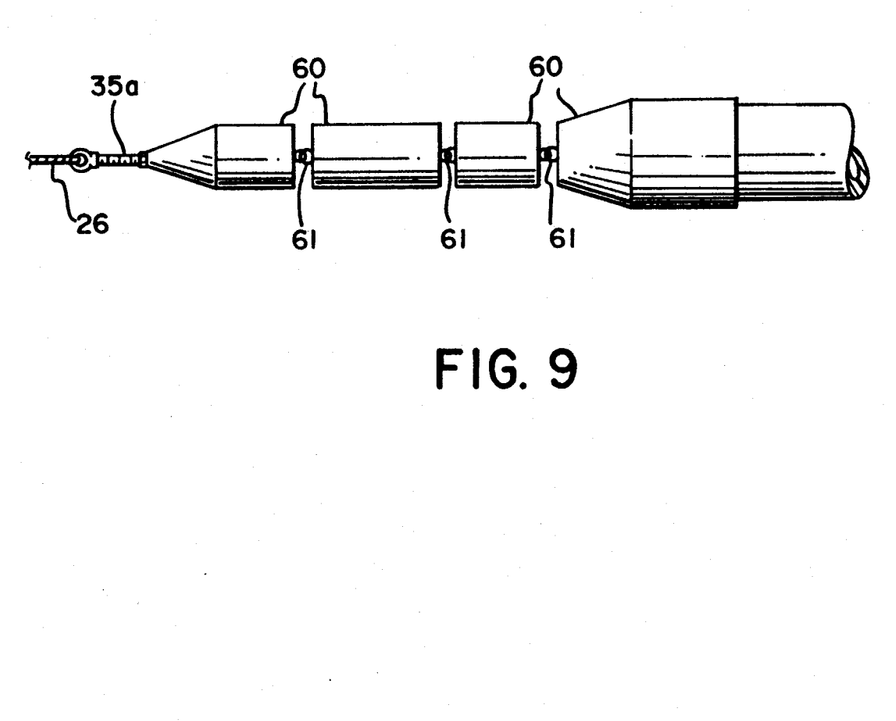
FIG. 9 illustrates schematically a modification of the present invention.

FIG. 9 illustrates schematically a variation of the present invention which is similar to the embodiment of FIGS. 3 through 5 except that the expander comprises a plurality of different sections 60 which are articulated together by articulating means 61 which may comprise for example a hook eye on each of the parts 60, connected together or via one or more chain links. The purpose of this embodiment is to facilitate movement of the expander in a curved path rather than a straight path. Of course in this embodiment the rod 35 would have to be replaced with a flexible rod or one having only front and rear portions.

The method of operation of the present invention will be apparent from the preceding discussion of the preferred embodiments. Nonetheless, for purposes of clarity, the method of operation of the present invention will be briefly described, especially with respect to FIGS. 6 through 8.

Figure 6:
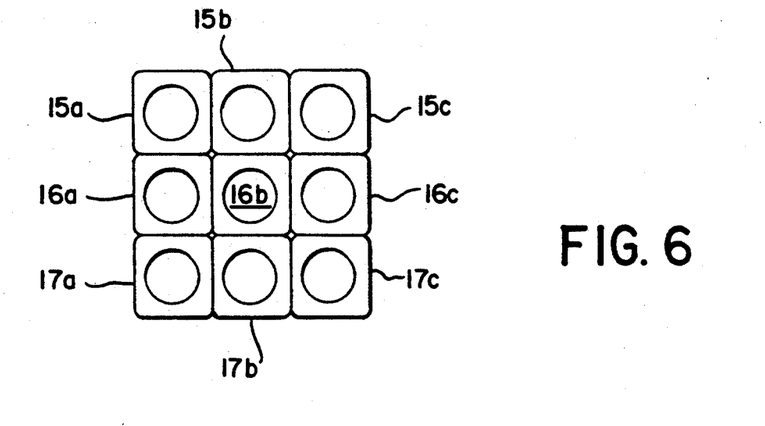
FIG. 6 is a schematic view of an end of a conduit bank prior to a replacement being made by the present invention.

FIG. 6 illustrates the nine conduits of the illustrated conduit bank 11. As shown in FIG. 6, somewhat more clearly than in FIGS. 1 and 2, the individual conduits are actually separate elongated blocks arranged side-by-side and stacked. Although shown up against each other, in practice sand or the like could be placed in the spaces at the corners or even between vertical and horizontal facing surfaces of the respective individual conduits, so that in practice the conduits actually may be physically separated by a layer of sand, dirt or the like.

To replace conduit 16b, a winch cable 26 is first extended from the cable vault 13 through the conduit 16b to the cable vault 12 whereat it is attached to towing eye 54. The expander 25 is then placed into the open end of conduit 16b. Entry is of course facilitated by the small front conical portion 36, which is then followed by cylindrical portion 37. As the knife blades 38 and/or the rearward flared portion 41 engage this opening, the power winch 28 is fully operated to pull the expander 25 through the conduit 16b. The knife blades 38, if provided, or however many are provided, will effect a slitting action, followed immediately by the flared out portion 41 which moves the broken conduit 16b outwardly. If conduit 16b is made of plastic or steel, then knife blades will be used to initially slit the conduit, after which the flared out portion 41 will expand the broken slit conduit outwardly. Alternatively, if the existing conduit is of a fractureable material such as tile, concrete or the like, this conduit will be fractured into irregular pieces which will be pushed outwardly by flared portion 41. In either event, as shown in FIG. 7, the expander 25 will move through the conduit, pulling the replacement conduit 30 behind it.

Figure 7:
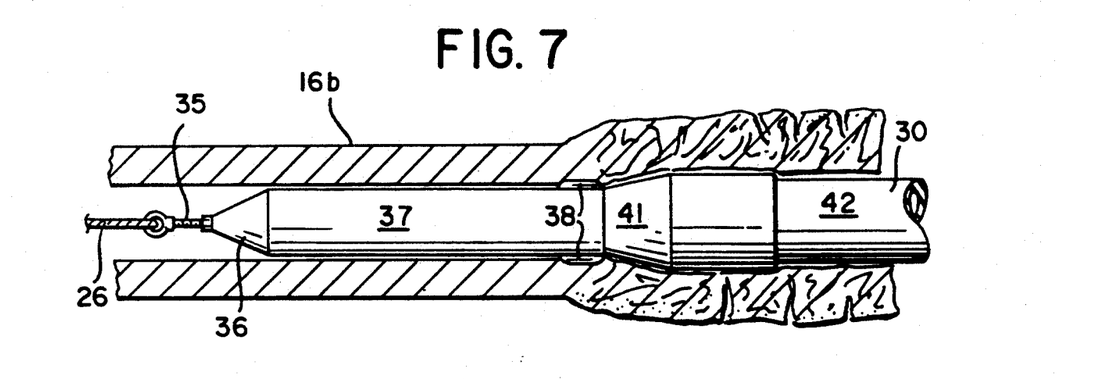
FIG. 7 is a schematic view of the apparatus of the present invention in use during a conduit replacement procedure.
Figure 8:
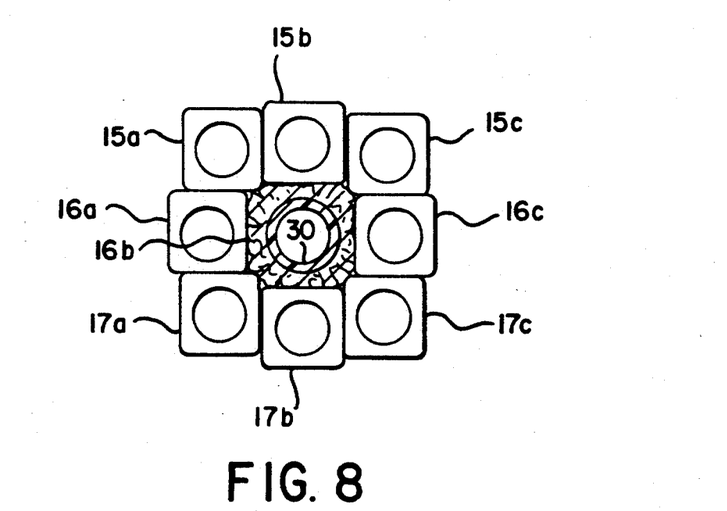
FIG. 8 is an end view similar to FIG. 6 but shown after one of the individual conduits has been replaced.

In the illustration of FIGS. 6 through 8, the material is considered to be crackable such as concrete, tile or the like. Knife blades are shown for illustration but might not be required. However, since this operation concerns the central conduit 16b which is surrounded by other conduits, knife blades might preferably be utilized to facilitate breakage. Alternatively, as mentioned above, additional knife blades could be provided, or in fact a conduit block could be expanded in many instances without knife blades.

In any event, when the expander 25 reaches the opposite end of the conduit bank at cable vault 13, it is removed and the replacement pipe 30 now extends completely therethrough. Referring to FIG. 8, in this particular example, outward expansion of the conduit 16b has caused some slight movement of the other conduits, especially conduits 15b, 16c, 17b and 16a, slightly outwardly. However, this slight movement does not render these conduits inoperable.

It will be understood that the present invention can be repeated for some or all of the remaining conduits of conduit bank 11. In each case, since the remaining conduits are all located around the periphery of the bank, knife blades, if used, could be arranged to effect the greatest cutting action closest to the central conduit 16b, so that the respective conduit being replaced would then be moved outwardly into the surrounding soil, minimizing the adverse effect of that operation on the adjacent central conduit 16b.

Existing conduits generally have inside diameters of three inches, three and a half inches and four inches. The rearward flared out portion should generally extend for at least one additional inch. For example, for a four inch existing conduit, the maximum diameter of rearward flared portion 41 would be approximately five inches. In axial length, a typical expander for a four inch conduit would have a front conical portion 36 of about three and a half to four inches, an intermediate cylindrical portion 47 of about fifteen inches and a rearward flared out portion 41 of about three to three and a half inches. The taper angle of the portion 36 would be about fifteen to twenty degrees and the taper angle of the portion 41 would be about ten degrees.

Although only preferred embodiments of the present invention have been illustrated and described herein, the invention is capable of numerous modifications and variations, apparent to those skilled in the art, without departing from the spirit and scope of the invention.

I claim:

1. In a conduit bank of the type having a plurality of individual conduits packed together and extending for an extended distance underground, a method of replacing only one of the individual conduits of the bank while leaving the other individual conduits operable, comprising the steps of:

moving into the individual conduit a front end of a conduit expander, which front end is narrow enough to enter one end of the individual conduit, which conduit expander also has an enlarged portion rearwardly of that front portion, the enlarged portion having its largest outside diameter being greater than the original inside diameter of the existing individual conduit, moving the conduit expander through the existing individual conduit, breaking the existing individual conduit and causing the enlarged portion to move the broken individual conduit outwardly by an amount which does not damage the adjacent other individual conduits of the bank, and moving into the individual conduit a replacement conduit which is attached to the conduit expander and which has an internal diameter at least approximately equal to the original inside diameter of the existing individual conduit.

2. A method according to claim 1, wherein the conduit expander has at least one knife blade on the exterior thereof, and including the step of slitting the existing individual conduit before such slit portions are engaged and moved outwardly by the enlarged portion of the conduit expander.

3. A method according to claim 1, including pulling the conduit expander through the individual conduit with power means connected to the front end of the conduit expander.

4. A method according to claim 1, wherein the conduit bank extends from a first underground surface access opening to a second underground surface access opening, and including introducing the conduit expander and attached replacement conduit into an individual conduit at one access opening and pulling the conduit expander through the individual conduit via a power means at the other access opening.

* * * * *